June 5, 1951 N. C. BREMER 2,556,151
QUICK DETACHABLE HUB
Filed May 1, 1946
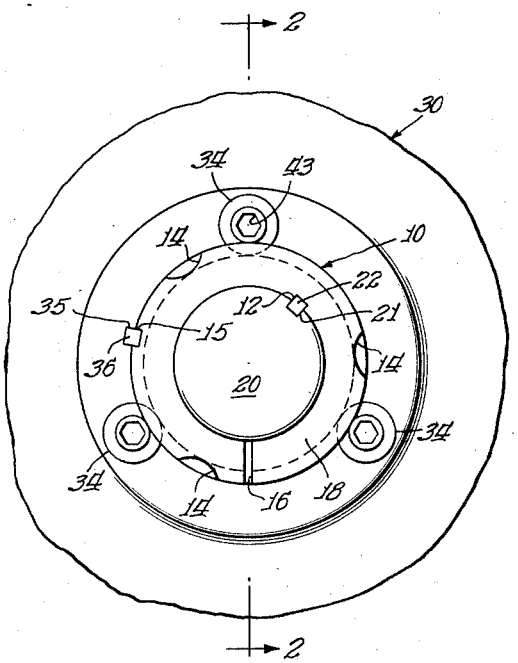
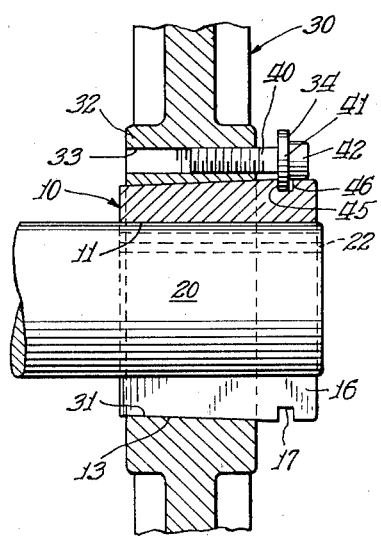
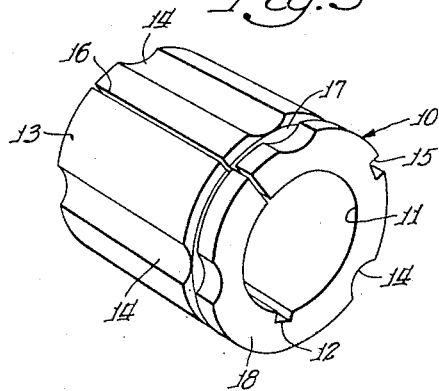
Inventor:
Norman C. Bremer Patented June 5, 1951

2,556,151

UNITED STATES PATENT OFFICE 2,556,151

QUICK DETACHABLE HUB

Norman C. Bremer, Ithaca, N. Y., assignor to Morse Chain Co., Ithaca, N. Y., a corporation of New York Application May 1, 1946, Serial No. 666,502

6 Claims. (Cl. 287—52.06)

This invention relates generally to hubs and more particularly to a detachable hub for joining a wheel to a shaft.

Where a variety of different sizes of sheave, pulley, sprocket or gear wheels are employed for power transmission and quick and easy interchangeability of wheels is desired, it is possible to provide such interchangeability for repair or other purposes by having a stock of detachable hubs which will cover the whole range of bore sizes of the wheels which are used. Hubs of this type are known in the art but are expensive to produce either by reason of the number of parts involved or because of difficult machining operations required. An additional disadvantage to those hubs which have a number of parts is that misplacement or loss of any one of the parts will frequently result in loss of time due to replacement of the part or to inability to use the hub.

It is an object of my invention, therefore, to provide a quick detachable hub which employs a minimum number of parts to effect a driving connection between a shaft and a wheel.

It is a further object of my invention to provide a quick detachable hub of such design that rapid production thereof is made possible by reason of the simplified machining operations which are required.

It is another object of my invention to provide simple means such as flanged cap screws which, when once secured to the wheel, serve to drive the hub into tight gripping engagement with the shaft and frictional engagement with the wheel when they are threaded in one direction and serve to force the hub out of gripping or frictional engagement with said shaft and wheel merely by being threaded in the opposite direction.

Still a further object of this invention is to provide a quick detachable hub having means, such as the screws mentioned above, for connecting the hub to the wheel, which means when once connected to the wheel do not need to be removed from said wheel in order to easily release the hub completely from the wheel and shaft.

Other objects and advantages of my invention will become apparent from a consideration of the following written description and the attached drawing which illustrates a preferred embodiment of the invention and in which:

Fig. 1 is a front elevational view showing the hub of my invention employed for connecting a shaft and wheel;

Fig. 2 is a sectional view on the plane of the line 2—2 of Fig. 1; and

Fig. 3 is a perspective view of the hub itself.

Like reference numerals are employed to indicate like portions of the mechanism throughout the several views.

Referring now to the figures of the drawing, the reference numeral 10 indicates generally the detachable hub which has a central longitudinal bore 11 interrupted by a longitudinal keyway 12 and which has a tapered external surface 13 interrupted by three longitudinal grooves 14 and a longitudinal keyway 15. The hub 10 is longitudinally split as at 16. A circumferential groove 17 encircles the hub near one end 18 and intersects the grooves 14 and keyway 15 substantially at right angles. The hub 10 from groove 17 to the end 18 has a uniform diameter except where interrupted by the grooves 14 and keyway 15, i. e., there is no taper on the external surface at this portion of the hub.

As may be noted most readily in Figs. 1 and 2, hub 10 is interposed between a shaft 20 and a wheel indicated generally at 30. The shaft 20 may have a longitudinal keyway 21 in which may be positioned a key 22 when the keyway 21 of shaft 20 and the keyway 12 of the hub 10 are aligned with one another. As will be more fully appreciated hereinafter, it is not essential that a key be employed between the shaft 20 and the hub 10 but such use is optional in providing a driving connection between the hub and shaft. If desired it would of course be possible to have a splined connection or some other interengaging connection between hub 10 and shaft 20.

The member fragmentarily shown in the drawing and indicated generally at 30 may be a sprocket wheel which has a tapered bore 31 and a hub portion 32 having three holes 33 drilled therethrough and tapped to provide a cooperating thread for their respective cap screws 34. It will be noted that the tapered bore 31 has a surface which is complementary to the external tapered surface 13 of the hub 10. There is a longitudinal keyway 35 interrupting bore 31 and this keyway, when aligned with keyway 15 in hub 10, permits the introduction of a key 36 to provide an interengaging driving connection between the hub 10 and wheel 30. It will be understood, of course, that such use of a key 36 is optional due to the tight frictional engagement which is possible between the hub and wheel. However, in practice, I have found it desirable to employ a key such as key 36 between the hub 10 and wheel 30. Although member 30 has been described as a wheel such description is not to be taken in a limiting sense since member 30 could be any member which has a bore and which is to be connected with a shaft for rotation.

Each of the screws 34 has a threaded shank 40, a flange 41 and a cap 42 having a socket 43 therein which may be engaged, for example, by a "hex" or "Allen" wrench. It will be noted that the flanges 41 of the screws seat in the groove 17 of the hub, the width of the groove exceeding the width of the flange so that the flange 41 may have axial movement therein. As shown in Fig. 2, the flanges 41 of the screws 34 bear against shoulder 45 which is formed in hub 10 by the groove 17 to thereby limit movement of the hub 10 outwardly of the hub portion 32 of the wheel 30. It will be readily seen that the screws 34 may be unthreaded from the hub portion 32 of the wheel whereupon the flanges 41 will come to bear upon shoulder 46 of the hub 10 to thereby force the hub outwardly from the wheel 30. The radius of curvature of the grooves 14 in hub 10 is substantially the same as the radius of curvature of the flanges 41 of screws 34 and the circumferential spacing of the screws 34 and grooves 14 corresponds so that when the grooves 14 are aligned circumferentially with the flanges 41 it is possible for the screws to be completely unthreaded from the wheel 30. Alternatively, it is possible for the hub to be removed from the wheel past the screws without removing the screws from the wheel.

From the foregoing description of its structure it will be readily seen that no difficult or unusual machining operations are necessary in producing the hub 10 or its related parts. Consequently hubs of this type may be inexpensively and rapidly manufactured.

In connecting a wheel, such as wheel 30, with a shaft such as shaft 20, a hub having the proper external and internal diameters is selected and inserted by hand into the tapered bore 31 of the wheel until friction prevents further insertion. Whether the screws 34 have first been partially inserted into the tapped holes 33 of the wheel 30 or are inserted subsequent to the insertion of the hub within the bore 31 of the wheel, it is necessary to align the grooves 14 of hub 10 with the holes 33 so that the hub and flange 41 may have relative axial movement to position the groove 17 of the hub 10 in alignment with the flanges 41 of the screws 34. Usually the screws 34 will be inserted subsequent to the insertion of the hub. Having once aligned the flanges 41 of screws 34 with the groove 17 of hub 10, said hub will be rotated in order to align its keyway 15 with keyway 35 of the wheel (in case a key such as 36 is to be employed between the hub and wheel) and so that the flanges 41 will be circumferentially spaced from the axially extending grooves 14. The screws 34 are then threaded into their respective holes 33 to cause the flanges 41 to bear against shoulder 45 to thereby force tapered hub 10 into the tapered bore 31 of the wheel. Generally the screws will be threaded inwardly a short distance at a time one after another around the circumference of the hub so as not to misalign the hub within the bore of the wheel. Since the bore 31 and external surface 13 are tapered at the same angle and since the hub is longitudinally split, inward movement of the hub, caused by the screws being threaded into holes 33, will contract the hub 10 into tight gripping engagement with the shaft 20 to provide a frictional driving connection. If it is desired to employ an interengaging driving connection between the hub 10 and shaft 20, the hub and wheel together may be rotated to align keyway 12 of hub 10 with keyway 21 of the shaft 20 so that a key 22 may be inserted therein.

It is of course possible in connecting wheel 30 with shaft 20, to have the wheel positioned about the shaft whereupon the hub 10 may be inserted over the shaft and partially within the wheel with the grooves 14 of said hub being aligned with the holes 33 in the wheel 30. Screws 34 may then be readily threaded into the holes 33 until the flanges 41 of said screws pass along the grooves 14 to the circumferential groove 17 whereupon the hub is rotated with respect to the wheel so that the flanges 41 are positioned in groove 17 at some point intermediate the grooves 14. If a key 36 is employed between the hub 10 and wheel 30 the hub and wheel will be relatively rotated until their respective keyways 15 and 35 match at which time the key 36 may be inserted therein. The screws 34 will then be tightened in sequence around the circumference of the hub so that said hub will be driven inwardly of the wheel and into tight gripping engagement with the shaft by reason of the contraction of the longitudinally split hub as it is wedged in the tapered bore 31 of the wheel 30.

To disconnect the wheel 30 and shaft 20 it is only necessary to thread the screws 34 outwardly from the wheel 30 so that the flanges 41 of the screws 34 engage the shoulder 46 formed in hub 10 by the groove 17. Further outward movement of the screws will then force the hub outwardly of the wheel and out of gripping engagement with the shaft 20 whereupon the hub may be rotated to bring the grooves 14 into alignment with the screws 34 to permit complete withdrawal of the hub by hand without removing the screws from the wheel. If a different hub having a different internal diameter is to be inserted into the wheel next, there is no danger of the screws 34 being misplaced or lost during such replacement since they remain threaded in the wheel 30.

While I have shown one preferred embodiment of my invention I do not intend to be limited to this form since various changes and modifications may be made therein without departing from the scope of the invention as determined by the appended claims.

I claim:

1. In a member having a bore therethrough, in combination, a detachable hub-like element for the bore of said member and providing a pair of spaced abutments, said hub-like element having a groove leading from an end of the element to a position between said abutments, means secured in said member and providing an abutment which is adjustable toward and away from said member and is positioned between the pair of abutments, said adjustable abutment when moved away from said member driving the element outwardly of the bore of the member and when moved toward said member driving said element into said bore of the member.

2. In a rotatable member having a bore, in combination, a detachable hub for said member providing a pair of spaced abutments, said hub having a groove leading from an end of the hub to a position between said abutments, means secured in said wheel and providing an abutment which is adjustable toward and away from said member and is positioned between the pair of abutments, said adjustable abutment when moved away from said member driving the hub outwardly of the bore of said member and when moved toward said member driving said hub into the bore of said member, said hub being releasable from said adjustable abutment by reason of said groove after said hub has been moved outwardly of said member by said adjustable abutment.

3. In a wheel having an axial bore, in combination, a detachable hub for said wheel providing a pair of spaced abutments, said hub having a groove leading from an end of the hub to a position between said abutments, means secured in said wheel and providing an abutment which is adjustable toward and away from said wheel, said adjustable abutment being permitted by passage through said groove to be positioned between said pair of abutments when an end of said hub is introduced into the bore of said wheel.

4. In a wheel having an axial bore, in combination, a detachable hub for said wheel providing a pair of spaced abutments, said hub having a groove leading from an end of the hub to a position between said abutments, means secured in said wheel and providing an abutment which is adjustable toward and away from said wheel and is positioned between said pair of abutments, said hub being drivable into frictional engagement within the bore of said wheel by adjustment of said second mentioned abutment toward the wheel and against one of the abutments of said pair of abutments.

5. In a wheel having an axial bore, in combination, a detachable hub for said wheel providing pairs of axially spaced abutments, said hub having a groove for each of said pairs of abutments leading from a position between a pair of abutments to one end of said hub, a plurality of means secured in said wheel and each providing an abutment which is adjustable toward and away from said wheel and is positioned between a pair of abutments, said adjustable abutments when moved away from said wheel driving the hub outwardly of the bore of said wheel and when moved toward said wheel driving said hub into the bore of said wheel, said hub being releasable from said adjustable abutments by reason of said grooves after said hub has been moved outwardly of said wheel by said adjustable abutments.

6. For use in connecting a wheel with a shaft which extends therethrough, the combination of a hub adapted to fit within said wheel and about said shaft, means on said hub providing a pair of shoulders, adjustable means carried by said wheel and having a flange adapted to fit between said shoulders whereby said latter means when moved in one direction providing a force exerted on the end of the hub in the direction of the wheel while holding the wheel stationary, thereby to position said hub within said wheel and in engagement with said shaft by bearing against one shoulder and when moved in the opposite direction providing a force exerted on the end of the hub in a direction away from the wheel, thereby moving said hub outwardly of said wheel and out of engagement with said shaft by bearing against the other shoulder, and means adapted to interconnect said wheel and hub to prevent relative rotation therebetween.

NORMAN C. BREMER.

REFERENCES CITED

The following references are of record in the file of this patent:

UNITED STATES PATENTS

| Number | Name | Date |
|---|---|---|
| 123,413 | Newell | Feb. 6, 1872 |
| 1,158,463 | Eaton | Nov. 2, 1915 |
| 2,396,414 | Firth | Mar. 12, 1946 |
| 2,415,033 | Nygren | Jan. 28, 1947 |
| 2,441,467 | Browning | May 11, 1948 |